(12) United States Patent
Byun

(10) Patent No.: US 6,363,656 B1
(45) Date of Patent: Apr. 2, 2002

(54) APPARATUS AND METHOD FOR GERMINATING GRAIN

(76) Inventor: Kook-Yun Byun, 915-7, Wagok 1-Dong, Kangse-Gu, Seoul (KR)

( * ) Notice: Subject to any disclaimer, the term of this patent is extended or adjusted under 35 U.S.C. 154(b) by 0 days.

(21) Appl. No.: 09/602,467

(22) Filed: Jun. 23, 2000

(30) Foreign Application Priority Data

Feb. 22, 2000 (KR) ............................................. 00-8547

(51) Int. Cl.⁷ ................................................. A01C 1/00
(52) U.S. Cl. ......................................................... 47/61
(58) Field of Search ............................................. 47/61

(56) References Cited

U.S. PATENT DOCUMENTS

| | | | | |
|---|---|---|---|---|
| 3,943,658 A | * | 3/1976 | Hai | |
| 4,315,380 A | * | 2/1982 | Davidson | 47/58.1 |
| 4,821,455 A | * | 4/1989 | Omente | 47/61 |
| 4,989,367 A | * | 2/1991 | Chung | 47/61 |
| 5,020,273 A | | 6/1991 | Johnson | 47/61 |
| 5,094,030 A | * | 3/1992 | Chia et al. | 47/61 |

FOREIGN PATENT DOCUMENTS

WO    WO 94/21107    *    9/1994

* cited by examiner

Primary Examiner—Peter M. Poon
Assistant Examiner—Jeffrey L. Gellner
(74) Attorney, Agent, or Firm—Lahive & Cockfield, LLP

(57) ABSTRACT

An apparatus and method to germinate and dry grain, such as oats, wheat, barley, etc. in only one apparatus under optimum conditions automatically and on an industrial scale in a short period of time. The apparatus comprises a rotatable drum having a plurality of drain holes pierced through a surface thereof and an insulating cover covering the drum for preventing heat within the drum from radiating or escaping. The apparatus also includes a sprayer for spraying water on the grain and treating structure connected to the sprayer for heating, purifying, and increasing the amount of dissolved oxygen in the water, while circulating the water to be supplied to the sprayer. A blower is also provided for heating, purifying, and blowing air into the drum. The apparatus makes it possible to produce germinated grain automatically by using electronic control devices and to produce large quantities of germinated grain in a short period of time without having to move grain from one place to another.

16 Claims, 5 Drawing Sheets

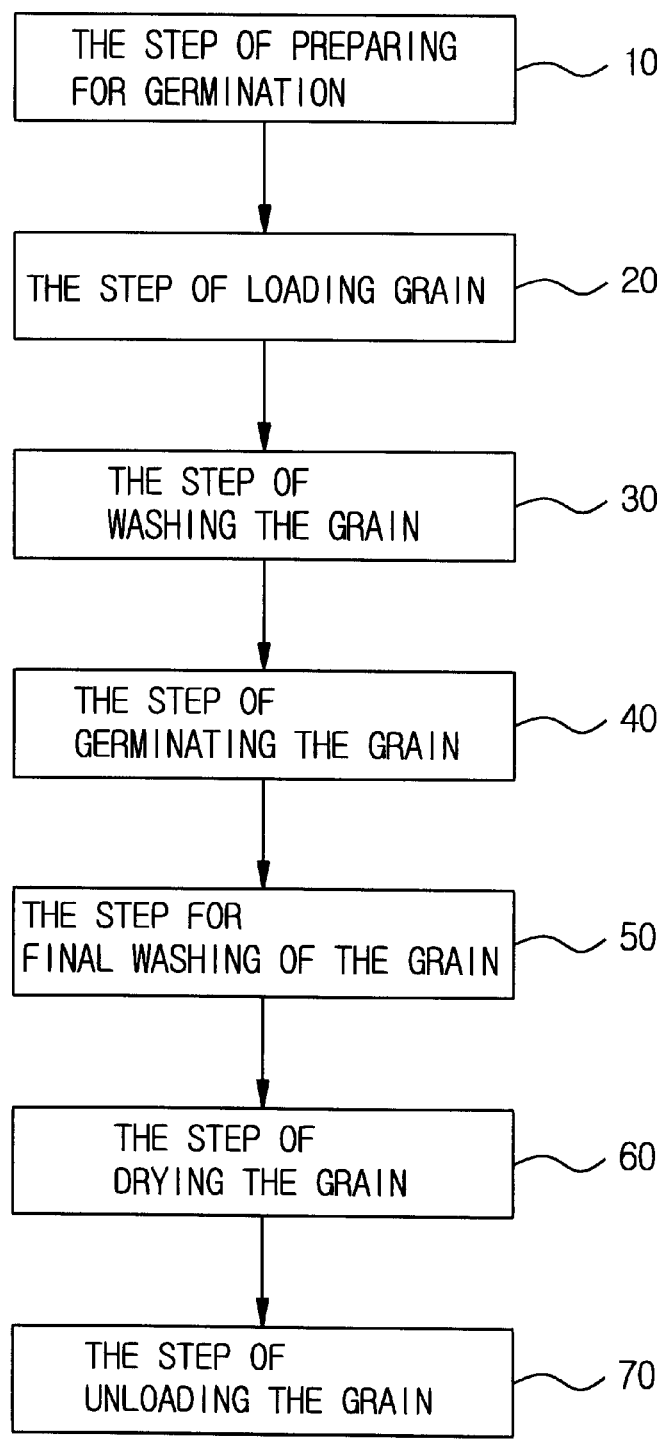

APPARATUS AND METHOD FOR GERMINATING GRAIN

BACKGROUND OF THE INVENTION

1. Field of the Invention

This invention relates to an apparatus and method for germinating grain automatically. More specifically, this invention relates to an apparatus and method that allow the grain such as oats, wheat, barley, etc. to be washed, germinated, and dried automatically in only the apparatus and on an industrial scale.

2. Prior Art

Generally, many studies prove that a dietary life heavily consisting of convenience food or meats can cause an increase in diseases of adult people because of acid poisoning of the blood. As a countermeasure to prevent these diseases of adult people, it is recommended that meat in the diet should be changed to a diet of cereals, and animal fat ingestion should be reduced. The grain and vegetable diets are recommended for ingesting much dietetic fiber that is lacking in the meat diet. Generally, grain such as brown rice, oats, wheat, barley, etc. contain the dietetic fiber in a large volume. If we ingest grains like brown rice in large quantities, immunity to disease is increased and the acid poisoning of blood can be prevented, since blood is changed into having an alkaline characteristic. As a result, the effects of aging will be prevented and the function of internal organs will be strengthened.

In particular, the grain germinated to a length of about 2.5° C. contain dietetic fiber, minerals, various vitamins, and calcium, etc. in a much larger volume. Also, the germinated grain can be cooked conveniently with smooth and sweet taste.

U.S. Pat. No. 5,020,273 (issued to Jesse D. Johnson) discloses a seed germinating device and method of use which allow seeds to be soaked in an aqueous solution and then aerated for germinating.

Conventionally, the grain is washed by manual processes at first, and then the washed grain will germinate by keeping the grain in a germination tank containing water. That is, a small amount of grain is soaked in water and kept covered with water for a predetermined period. The grain soaked in water will germinate after about 52 to 64 hours. Hereinafter, the germinated grain is transferred from the germination tank to a separate apparatus for drying. Duration for drying the grain is about 48 to 52 hours. We can obtain the germinated grain by repeating the process described above.

However, this method described above requires a large number of laborers because the grain germinates by a number of manual processes. Also, this method has a disadvantage of requiring a long period and makes it impossible to obtain the germinated grain automatically and on a large scale. Moreover, the grain obtained is not generally in a homogeneous state because the grain germinates while contacting the atmosphere.

Therefore, a problem occurred because the price of the germinated grain rose. However, various germinated grains has been widely consumed since they are good for the health.

SUMMARY OF THE INVENTION

The present invention is proposed to solve the above problems of the conventional art.

It is the first object of the present invention to provide an apparatus and method for germinating grain that make it possible to produce the germinated grain in a large quantity in a short period by allowing the grain to be washed, germinated, and dried in only the apparatus.

It is the second object of the present invention to provide an apparatus and method for germinating grain that make it possible to produce the germinated grain at a low cost and with few laborers.

It is the third object of the present invention to provide an apparatus and method for germinating grain that make it possible to produce the germinated grain automatically by using electronic control devices without manual processes.

It is the fourth object of the present invention to obtain the germinated grain of good quality by spraying water that is heated, purified, and disinfected on the grain under optimum condition.

In order to achieve the above objects, an apparatus for germinating the grain according to the present invention comprises a drum for containing the grain to be germinated having a plurality of drain holes pierced through a surface thereof and an insulating cover covering the drum for preventing heat within the drum from radiating, the drum capable of rotating about an axis thereof; spraying means extending through the drum in longitudinal direction thereof, for spraying water on the grain; treating means connected to an end of the spraying means for heating, purifying, and increasing the amount of dissolved oxygen in the water, while circulating the water to be supplied to the spraying means; and blowing means connected to a portion of the drum, for heating, purifying, and blowing air into the drum.

Here, both of the end portions of the drum have a hollow truncated cone shape. The drum further comprises a plurality of distributing plates protruded from an inner surface of the drum along a longitudinal direction thereof for substantially distributing and remixing the grain by the rotation of the drum. The drum further comprises at least one ultraviolet lamp attached to the spraying means to sterilize the inside of the drum.

Meanwhile, the apparatus further comprises at least one lifter located at one end portion of the insulating cover, for elevating a portion of the insulating cover to help the germinated grain discharge when the germination is completed, and at least one hinge located at the other end portion of the insulating cover, for rotatably securing the drum while the lifter lifts the drum.

Meanwhile, the spraying means comprises a washing pipe with a plurality of nozzles each having a relatively larger diameter to wash the grain by spraying the water on the grain, and a germinating pipe with a plurality of nozzles each having a relatively smaller diameter to maintain the humidity inside the drum at a predetermined level for germination by spraying the water on the grain, the washing pipe and the germinating pipe mounted on the drum at a predetermined interval to avoid interruption of the rotation of the drum.

The treating means comprises a reservoir for containing the circulating water, a circulating pump connected to one position of the reservoir for circulating the water to be supplied to the spraying means, a washing pump located between one end of the washing pipe and another portion of the reservoir for supplying the circulating water to the washing pipe, and a germinating pump located between one end of the germinating pipe and another portion of the reservoir for supplying the circulating water to the germinating pipe.

Also, the treating means comprises a thermal sensor attached at an inner position of the reservoir to sense the temperature of the circulating water, a controller electrically connected to the thermal sensor to generate a control signal as a result of sensing of the thermal sensor, and a heater located in a selected position of the water treating means to heat the circulating water to a predetermined temperature according to the control signal.

Also, the treating means comprises a water purifier located in a selected position of the treating means and including pieces of porphyritic feldspar to purify the circulating water.

Also, the treating means comprises an oxygen supplier located at a selected position of the treating means to increase the amount of dissolved oxygen in the circulating water.

Also, the treating means comprises an ozone generator located between one end of a germinating pipe and one portion of the reservoir for providing the circulating water with an amount of ozone to disinfect the grain and the drum.

Meanwhile, the blowing means comprises a first ventilator connected to an end of the drum for heating the air to a predetermined temperature and supplying it into the drum at a predetermined temperature while the washed grain is germinating and a second ventilator connected to the end of the first ventilator at the end of the drum for heating the air to a predetermined temperature and supplying it into the drum while the germinated grain is being dried, the second ventilator having a relatively larger capacity than the first ventilator.

The first ventilator comprises a first fan for generating air to be supplied into the drum, a first thermal sensor attached to the drum for sensing the temperature inside of the drum, a first controller electrically connected to the first thermal sensor for generating a control signal as a result of sensing the temperature by the first thermal sensor, a first heater located between the first fan and the drum for heating the air to the temperature of 25 to 35° C. according to the control signal, and a first air filter located between the first fan and the drum for removing impurities in the air.

The second ventilator comprises a second fan for generating air to be supplied into the drum, a second thermal sensor attached inside the drum for sensing the temperature inside the drum, a second controller electrically connected to the second thermal sensor for generating a control signal as a result of sensing the temperature by the second thermal sensor, a second heater located between the second fan and the drum for heating the air to the temperature of 40 to 70° C. according to the control signal, and an second air filter located between the second fan and the drum for removing impurities in the air.

Meanwhile, the apparatus further comprises a connector made of flexible material for connecting the drum to the air blowing means.

The method for germinating grain, comprises the steps of: (a) while circulating water supplied from an external source, heating the water to a selected temperature, purifying the heated water, increasing the amount of dissolved oxygen in the purified water, switching on an ultraviolet lamp, and rotating a drum for containing the grain about its axis at 1 to 20 revolutions per hour; (b) loading grain to be germinated to the drum; (c) washing the grain in the drum by strongly spraying the water treated in step (a) on the grain continuously for 50 to 70 minutes to remove dirt on the grain and then spraying the water on the grain intermittently for 25 to 37 hours by 4 to 6 minutes per hour to wash the grain by self-purification; (d) adding an amount of ozone to the water and spraying on the grain for disinfecting the grain and the drum and maintaining the inside of the drum at a predetermined humidity, and at the same time, blowing air having a temperature of 25 to 35° C. into the drum for 25 to 37 hours, thereby the grain germinates; (e) washing the germinated grain by spraying the circulating water for 15 to 20 minutes; (f) drying the grain by blowing the air having a temperature of 40 to 70° C. for 5 to 10 hours, making the water content of the grain 11 to 15 weight percent; and (g) unloading the grain by lifting one portion of the drum at a predetermined angle to the horizontal axis of the drum to help the grain discharged when the germination is completed.

BRIEF DESCRIPTION OF THE DRAWINGS

FIG. 5 is a flow diagram of method of germination according to a preferred embodiment of this invention.

DETAILED DESCRIPTION OF THE PREFERRED EMBODIMENTS

Preferred embodiments of the present invention will be illustrated below with reference to the accompanying drawings.

Figure 1:
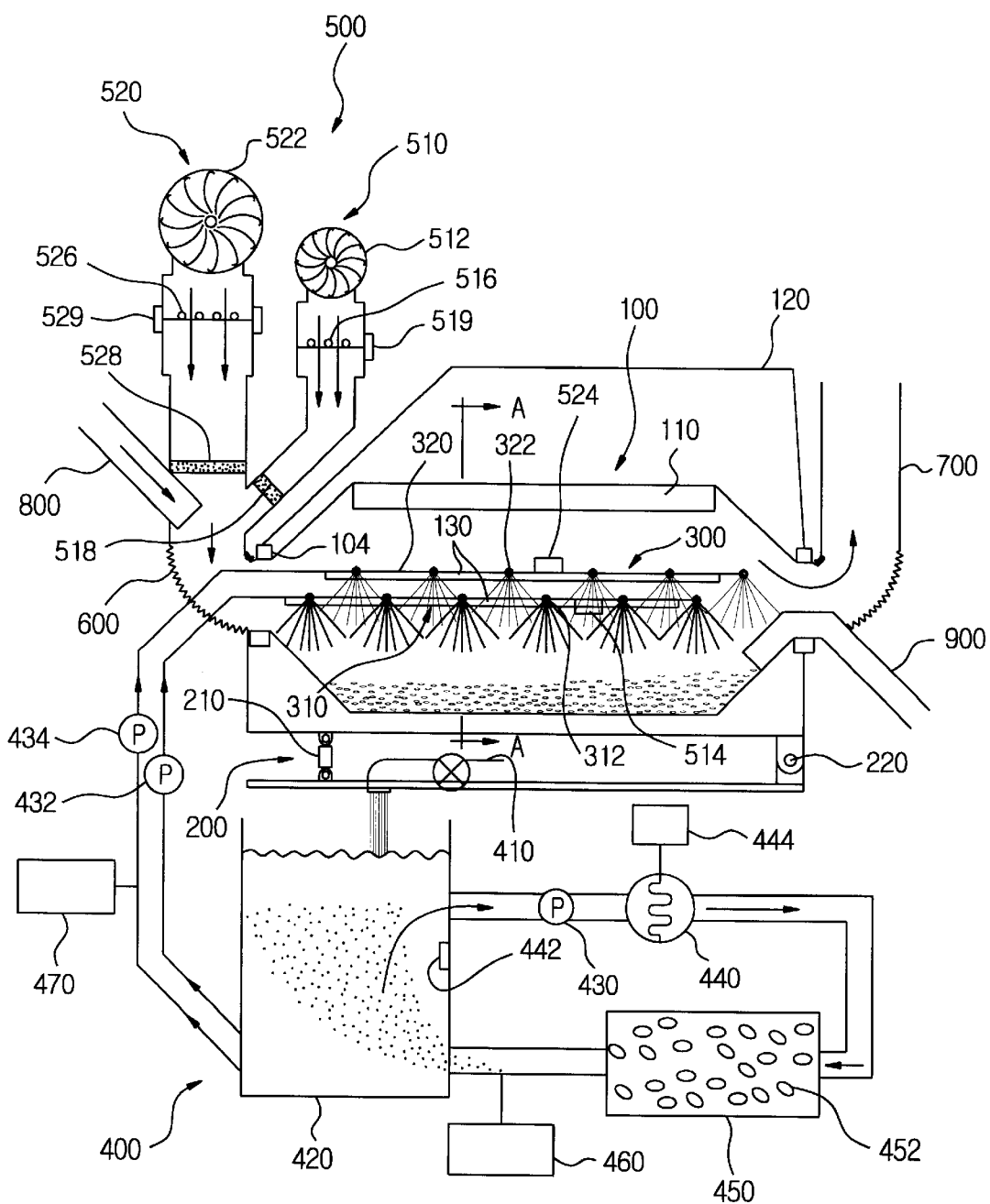
FIG. 1 is a view for showing a schematic construction of an apparatus for germinating the grain according to a preferred embodiment of this invention.
Figure 2:
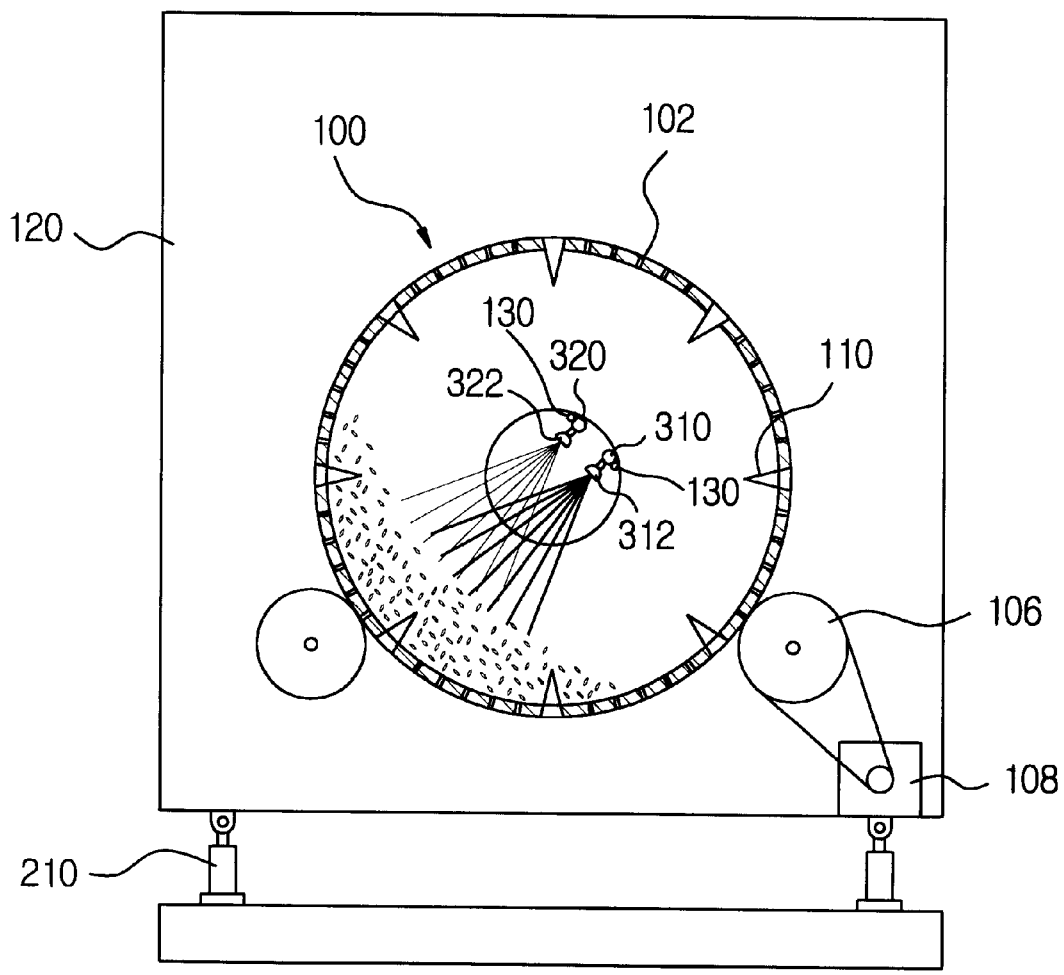
FIG. 2 is a sectional view taken substantially along line A—A of FIG. 1.

FIG. 1 is a view for showing a schematic construction of an apparatus for germinating the grain according to a preferred embodiment of this invention. FIG. 2 is a sectional view taken substantially along line A—A of FIG. 1. An apparatus for germinating the grain according to this invention comprises a drum 100, a spraying means 300, a treating means 400, and a blowing means 500.

Illustrated more specifically, as shown in the accompanying drawings, the drum 100 is a hollow storage vessel into which the grain to be germinated is stored and treated. The drum 100 has a shape of an elongated cylinder so as to rotate about its axis smoothly. Both end portions of the drum 100 can have a shape of a hollow truncated cone to prevent the grain from falling out of the drum 100 while the drum 100 is rotating about its axis. The size of the drum 100 will be determined in accordance with a given condition, that is, the amount of the grain to be germinated, a kind of grain, etc. Preferably the diameter of the drum 100 is about 2.5m and the length of the drum 100 is about 20m. Also, the size of the drum 100 can be determined to allow the grain to germinate at a rate of 40 tons per 1 cycle.

The drum 100 has a plurality of drain holes 102 pierced through its surface as described in FIG. 2. The size of each of the drain holes 102 is smaller than the bulk of the grain to prevent the grain in the drum 100 from falling out, and the shape of the drain holes 102 is formed so that the water will drain effectively. Preferably the shape of the drain holes 102 is round so that the drain holes 102 are drilled easily. The drain holes 102 allow the water sprayed on the grains to flow out of the drum 100.

The drum 100 can be supported by bearings 104 that are mounted on the peripheral surface of the inlet port and the outlet port of the drum respectively. The bearings 104 allow the drum 100 to rotate smoothly.

The drum 100 can rotate about its axis. Support rollers 106 that are a kind of friction wheel are installed to contact with an outer surface of the drum 100. Meanwhile, the support rollers 106 can be substituted for a separate support device and gear or chain, etc. The support rollers 106 transfer turning effect to the drum 100 because they are electrically connected to an external power source 108 such a prime mover, a motor, etc. The speed of the drum 100 can be regulated by any controller. The grain in the drum 100 are distributed as the drum 100 rotates. Thus, heat and oxygen are uniformly transferred and the grain is preserved from rotting. Preferably revolutions per hour of the drum 100 are about 1 to 20.

The drum 100 is installed on one portion of the inside of an insulating cover 120. Because the insulating cover 120 prevents the heat within the drum 100 from radiating, the inside of the drum 100 is easily maintained at a suitable temperature for germination, and electrical energy is economized. Also, the insulating cover 120 prevents dust from entering into the drum 100. Therefore, clean grain germinates. The water drained from the drum 100 via the drain holes 102 may be treated by separate water collection equipment (not shown) that is installed in the insulating cover 120. Also, the external power source 108 may be installed on one portion of the inside of the insulating cover 120.

As described FIG. 2, the drum 100 can comprise a plurality of distributing plates 110. The distributing plates 110 protrude from an inner surface of the drum 100 along a longitudinal direction of the drum 100. The distributing plates 110 can be formed on the inner surface of the drum 100 in a radial manner. The distributing plates 110 substantially distribute and remix the grain by moving up and down the grain while the drum 100 rotates. Therefore, the grain is germinated and dried effectively.

The drum 100 may further comprise at least one ultraviolet lamp 130 attached to the spraying means 300. Preferably the ultraviolet lamp 130 is attached on a washing pipe 310 or a germinating pipe 320 over an entire length of the drum 100. The ultraviolet lamps 130 provides a high proportion of ultraviolet light, such as various forms of mercury-vapor lamps. Here, the ultraviolet light is electromagnetic radiation in the wavelength range 4 to 400 nanometers. This range begins at the short-wavelength limit of visible light and overlaps the wavelengths of long X-rays. The ultraviolet light sterilizes the inside of the drum 100 and maintains the inside of the drum 100 under an optimum condition of germination.

The drum 100 may comprise the means for inclining the drum 100. The drum inclining means 200 elevates a portion of the drum 100 relatively high to help the grain discharge. The drum inclining means 200 can comprise at least one lifter 210 to elevate a portion of the drum 100 relatively high and at least one hinge 220 to rotatably secure the drum 100 while the lifter 210 lifts the drum 100. The lifter 210 may be a lifting cylinder, a lifting jack, etc. The hinge 220 serves as the axis of rotation. The lifter 210 may be mounted on one lower portion of the insulating cover 120. The hinge 220 may be mounted on the other lower portion of the insulating cover 120. If the lifter 210 causes the drum 100 to slope, the remaining grain gathers around the outlet portion of the drum 100. Therefore, the remaining grain can be discharged from the drum 100 easily.

The water spraying means 300 sprays the water on the grain in the drum 100. The water spraying means 300 can comprise a washing pipe 310 with a plurality of nozzles 312 for washing the grain and a germinating pipe 320 with a plurality of nozzles 322 for maintaining the drum 100 at a predetermined humidity for germination.

The washing pipe 310 is a passageway through which the water flows. The washing pipe 310 has a plurality of nozzles 312 fitted to the surface of the washing pipe 310 by a predetermined interval. The nozzles 312 are tubelike devices for accelerating and directing the water, in which pressure decreases as it leaves the nozzles 312. The water is sprayed on the grain via the nozzles 312. The washing pipe 310 is installed in the drum 100 over an entire length of the drum 100. That is, the washing pipe 310 may be fixed to the inlet port of the drum 100 by a bracket (not shown) fixed to one side of the inlet port of the drum 100. Also, the washing pipe 310 has to be mounted at a predetermined position of the drum 100 so as not to interrupt the rotation of the drum 100. As described in FIG. 1, the water in the washing pipe 310 is sprayed strongly on the grain via each of the nozzles 312 to wash dust or mud, etc. from the grain. The diameter of each of the nozzles of the washing pipe 310 is formed to be larger than that of the germinating pipe 320. If the water is sprayed while the drum 100 rotates, the grain is washed well due to friction of the grain.

The germinating pipe 320 is a passageway through which the water flows. The germinating pipe 320 has a plurality of nozzles 322 fitted to the surface of the germinating pipe 320 by a predetermined interval. The germinating pipe 320 is installed in the drum 100 over an entire length of the drum 100 in a parallel manner. The germinating pipe 320 can be fixed to the inlet port of the drum 100 by a bracket (not shown) fixed to one side of the inlet port of the drum 100. The germinating pipe 320 has to be mounted on one portion of the drum 100 so as not to interrupt the rotation of the drum 100. The water in the germinating pipe 320 is continuously sprayed on the grain as a mist via each of the nozzles 322 to maintain the inside of the drum 100 at a suitable humidity for germination. The diameter of each of the nozzles of the germinating pipe is smaller than that of the washing pipe because the water of the germinating pipe must be sprayed as a mist.

The water treating means 400 treats the water for washing and germinating grain from an external water source 410 to the water spraying means 300. The water supplying means 400 comprises various devices that treat the water to optimum condition for germinating the grain while the water is circulating through the devices.

The water for washing and germinating grain is supplied from a external water source 410. The water treating means 400 comprises a reservoir 420 for temporarily containing the circulating water, a circulating pump 430 for circulating the water, a washing pump 432 supplying the circulating water to the washing pipe 310, and a germinating pump 434 supplying the circulating water to the germinating pipe 320. The circulating pump 430 causes the water supplied from the external water source 410 to circulate via the elements of the water treating means 400. Preferably the circulating pump 430 is located between the reservoir 420 and the heater 440. The washing pump 432 supplies the water in the reservoir 420 to the washing pipe 310. Preferably the washing pump 432 is located between the washing pipe 310 and the reservoir 420. The germinating pump 434 supplies the water in the reservoir 420 to the germinating pipe 320. Preferably the germinating pump 434 is located between the washing pipe 310 and the reservoir 420. The washing pump 432 and the germinating pump 434 may have automatic timers that can automatically adjust the volume of the water to be sprayed on the grain in the drum 100, respectively.

The water treating means 400 comprises a heater 440. The heater 440 heats the circulating water in order to adjust the temperature of the circulating water to a suitable temperature for germination. The heater 440 operates together with a thermal sensor 442 and a controller. The thermal sensor 442 senses a temperature of the circulating water and transfers the sensing signal to the controller 444. The controller 444 is electrically connected to the thermal sensor 442 and the heater 440. The controller 444 generates a control signal as a result of sensing the thermal sensor 442. The heater 440 heats the circulating water to a predetermined temperature according to the control signal. That is, the controller 444 controls the heater 440 by receiving signals from the thermal sensor 442. Therefore, the controller 444 can control the temperature of the water to be sprayed on the grain. The thermal sensor 442 may be attached to the reservoir 420 or on the germinating pipe 320. The controller 444 may be attached to one portion of the heater 440 or at a separate position. Preferably the controller 444 maintains the temperature of the circulating water between 25° C. and 35° C.

The water treating means 400 further comprises a water purifier 450. The water purifier 450 removes dirt or foreign substances from the water. The water purifier 450 may include pieces of porphyritic feldspar 452, namely "baku han seki" in Japan and "Maek Ban Suk" in Korea. It is a natural yellowish stone with a shape of a goose egg or united barley, which can purify water. The main ingredients and weight percent are $SiO_2$ 69.76, $Al_2O_3$ 14.91, $MgO$ 3.55, $K_2O$ 3.19, $Na_2O$ 3.16, $CaO$ 2.00, $FeO$ 1.40, $Fe_2O_3$ 1.29, $TiO_2$ 0.30, $P_2O_5$ 0.26, $MnO$ 0.02. Also, the water purifier 450 may further comprise lumps of charcoal, sand, and a filter, etc. to increase the purification rate. The water purifier 450 is located at a selected position. Preferably the water purifier 450 is located between the reservoir 420 and the water heater 440.

The water treating means 400 further comprises an oxygen supplier 460. The oxygen supplier 460, a machine that compresses air or gas, allows the water to contain oxygen. The oxygen supplier 430 increases the amount of dissolved oxygen within the water. The germination of the grain may be accelerated by the supply of oxygen because oxygen is required when the grain germinates. Preferably the oxygen supplier 460 is located between the water purifier 450 and the reservoir 420.

The water treating means 400 further comprises an ozone generator 470. The ozone generator 470 is an apparatus that converts oxygen into ozone by subjecting the oxygen to an electric brush discharge. Ozone is a poisonous blue gas that is a type of oxygen, and serves to destroy bacteria. The ozone generator 470 located between the germinating pump 434 and the reservoir 420 supplies ozone to the water to be supplied to the germinating pipe 320 and disinfects the water. Accordingly, if the water containing ozone is sprayed on the grain in the drum 100, decomposition of the grain will be prevented because the grain in the drum 100 and the inside of the drum 100 are disinfected. Also, the germinated grain having good quality can be obtained according to above.

The air blowing means 500 blows air which is heated and purified into the drum 100 so that the grain is germinated and dried effectively. The air blowing means 500 may be mounted on a separate frame or on one portion of the insulating cover 120. The air blowing means 500 can comprise a first ventilator 510 supplying the air which is heated and purified to the drum 100 for keeping the inside of the drum 100 at a predetermined temperature during germination and a second ventilator 520 supplying the air which is heated and purified to the drum 100 for keeping the inside of the drum 100 at a predetermined temperature during drying.

The first ventilator 510 comprises a first fan 512 for generating air to be supplied into the drum 100, a first thermal sensor 514 attached to the drum 100, a first heater 516 for heating the air, a first air filter 518 for removing impurities in the air, and a first controller electrically connected to the first thermal sensor 514 and the first heater 516.

The first ventilator 510 serves to blow the air that is heated and purified for germination into the drum 100. The first fan 512 pumps air to be supplied into the drum 100 to ventilate and maintain the drum 100 at a suitable temperature for germination. The first heater 516 is a machine for heating the air to be supplied into the drum 100. The first air filter 518 is equipment that removes impurities in the air. The first thermal sensor 514 is used for sensing the temperature of the inside of the drum 100, and is attached to one inner portion of the drum 100. Preferably the first thermal sensor 514 is attached to a portion of the water spraying means 300 so as to sense exactly the temperature inside of the drum 100 without contacting the grain.

The first controller 519 is used for maintaining the inside of the drum 100 at a suitable temperature for germination. That is, the first controller 519 is electrically connected to the first thermal sensor 514 and the first heater 516. The first controller 519 receives signals from the first sensor 514 and then controls the first heater 516 by generating a control signal as a result of sensing by the first thermal sensor 514. Preferably the first controller 519 controls the first heater 516 to maintain the inside of the drum 100 at 26° C.–32° C. while the grain is germinated. The first ventilator 510 is operated until the grain is completely germinated. It is preferable that the first heater 516 is located between the first fan 512 and the drum 100, and the first air filter 518 is located between the first heater 516 and the drum 100 for the heated air to pass through it.

The second ventilator 520 comprises a second fan 522 for generating air to be supplied into the drum, a second thermal sensor 524 attached to the drum 100, a second heater 526 for heating the air, a second air filter 528 for removing impurities in the air, and a second controller 529 electronically connected to the second thermal sensor 524 and the second heater 526.

The second ventilator 520 serves to blow the air that is heated and purified into the drum so as to dry the germinated grain. The second fan 522 pumps the air into the drum 100 to dry the germinated grain. The second fan 522 has much larger capacity than the first fan 512 because drying the grain needs more air than germinating the grain.

The second heater 526 heats the air to be supplied into the drum. The second air filter 528 is equipment that removes impurities in the air. The second thermal sensor 524 is used for sensing the temperature inside of the drum 100, and is attached to one inner portion of the drum 100. The second controller 529 is used for maintaining inside of the drum 100 at a suitable temperature for drying. That is, the second controller 529 is electrically connected to the second thermal sensor 524 and the second heater 526. Therefore, the second controller 529 receives signals from the second sensor 524 and then controls the second heater 526 by generating a control signal according to a result of sensing by the second thermal sensor 524. Preferably the second controller 529 controls the second heater 526 to maintain the inside of the drum 100 at 40° C.–70° C. while the grain is dried. The second ventilator 520 operates until the grain is completely dried. Preferably the second heater 526 is located between the second fan 522 and the drum 100, and the second air filter 528 is located between the second heater 526 and the drum 100 for the heated air to pass through it.

The apparatus for germinating the grain according to a preferred embodiment of this invention further comprises a connector 600 made of flexible material for connecting the drum 100 with the blowing means 500. The connector 600 allows the drum 100 to move effectively while the lifter 210 is operating. Also, the connector 600 can be coupled with the inlet portion of the drum 100. Meanwhile, one end of the connector 600 is one and the other end may be divided into two, here one end of the connector 600 is connected with the drum 100 and the other is connected with the first ventilator 510 and is connected with the second ventilator 520, respectively.

The apparatus for germinating the grain according to a preferred embodiment of this invention further comprises an air discharging pipe 700. The air discharging pipe 700 is connected with the outlet port of the drum 100. The air discharging pipe 700 is a passageway along which the air used for germinating or drying the grain is discharged into the atmosphere. The air discharging pipe 700 may be made of flexible material which bends easily while the drum inclining means 200 operates.

The apparatus for germinating the grain according to a preferred embodiment of this invention further comprises a grain supply pipe 800. The grain supply pipe 800 is connected with the inlet port of the drum 100. The grain supply pipe 800 is an apparatus that has a controlling valve, etc. regulating opening and closing the grain supply pipe 800. The grain supply pipe 800 is connected to a grain storehouse 810 located at a higher position than the drum 100 and therefore the grain is supplied automatically by opening the valve of the grain supply pipe 800. The grain to be germinated can be supplied automatically by a vacuum pump, etc.

The apparatus for germinating the grain according to a preferred embodiment of this invention further comprises a grain suction pipe 900. The grain suction pipe 900 is connected to the outlet port of the drum 100. The grain that is germinated and dried is discharged into a germinated grain storehouse 910 via the grain suction pipe 900 by pumping of the grain suction pump 920. The grain suction pipe 900 can be made of flexible material to be easily inserted into the drum 100. The germinated grain is temporarily stored in the germinated grain storehouse 910.

The apparatus for germinating grain according to this invention may be operated automatically by a control box (not shown). The elements of the germinating apparatus, that is, the external power source 108, the circulating pump 430, the washing pump 432, the germinating pump 434, the first heater 516, the second heater 526, the grain suction pump 920, etc. are electrically connected with one another, and thus can be continuously controlled by the control box (not shown).

Hereinafter, a method for using the apparatus for germinating the grain according to the present invention will be described referring to the accompanying drawings.

Figure 3:
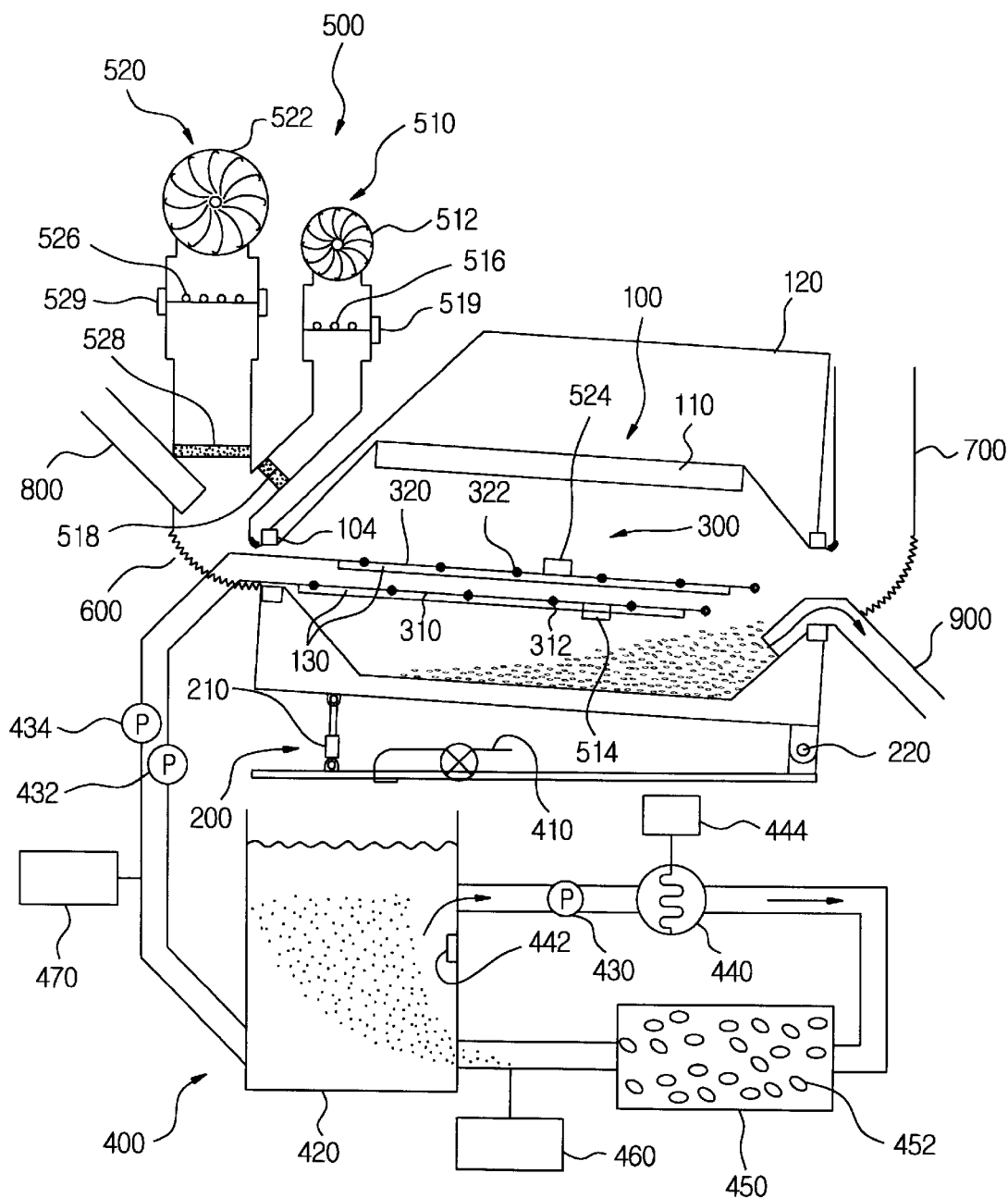
FIG. 3 is a view for showing a schematic operational state of an apparatus for germinating the grain according to a preferred embodiment of this invention.
Figure 4:
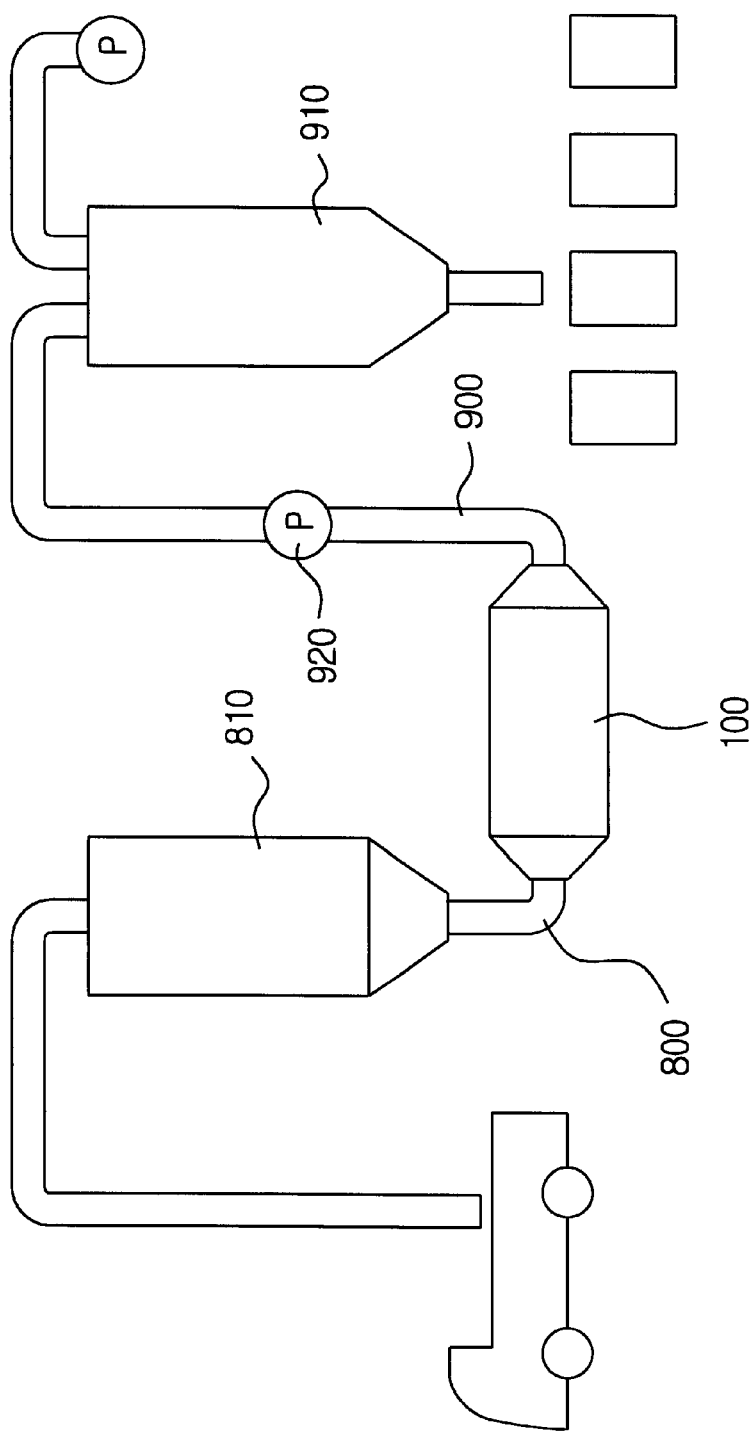
FIG. 4 is a view for showing schematically a using state of an apparatus for germinating the grain according to a preferred embodiment of this invention.

FIG. 3 is a view for showing a schematic operational state of an apparatus for germinating grain according to a preferred embodiment of this invention. FIG. 4 is a view for showing schematically a using state of an apparatus for germinating grain according to a preferred embodiment of this invention. FIG. 5 is a flow diagram of method of germination according to a preferred embodiment of this invention.

A method for germinating the grain according to this invention comprises the steps of: (a) while circulating water supplied from an external source, heating the water to a selected temperature, purifying the heated water, increasing the amount of dissolved oxygen in the purified water, switching on a ultraviolet ramp, and rotating a drum for containing the grain about its axis at 1 to 20 revolutions per hour; (b) loading grain to be germinated to the drum; (c) washing the grain in the drum by strongly spraying the water treated in step (a) on the grain continuously for 50 to 70 minutes to remove dirt on the grain and then spraying the water on the grain intermittently for 25 to 37 hours by 4 to 6 minutes per hour to wash the grain by self-purification; (d) adding an amount of ozone to the water and spraying on the grain for disinfecting the grain and the drum and maintaining the inside of the drum at a predetermined humidity, and at the same time, blowing air having a temperature of 25 to 35° C. into the drum for 25 to 37 hours, thereby the grain germinates; (e) washing the germinated grain by spraying the circulating water for 15 to 20 minutes; (f) drying the grain by blowing the air having a temperature of 40 to 70° C. for 5 to 10 hours, making the water content of the grain 11 to 15 weight percent; and (g) unloading the grain by lifting one portion of the drum at a predetermined angle to the horizontal axis of the drum to help the grain discharge when the germination is completed.

As described in FIG. 5, the step (a) 10 is the step for preparing germination.

The user operates the water treating means 400 about a couple of hours before and increases the temperature of the water to about 25° C.–35° C. That is, the user puts the right amount of water from the external water source 410 into the reservoir 420. The water in the reservoir 420 is fed through a pipe, etc. into the heater 440. The heater 440 heats the water until the temperature of the water is raised to about 25° C.–435° C. At that time, the controller 444 which receives signals from the thermal sensor 442 controls the heater 440. This temperature is a suitable temperature for germination and can be changed according to an amount or a kind of grain. Next, the heated water is fed through a pipe, etc. into the water purifier 450. The water purifier 450 removes the dirty or impurities from the heated water. Next, the purified water is fed through a pipe, etc. into the oxygen supplier 460. The oxygen supplier 460 increases the amount of dissolved oxygen in the purified water. Next, the water containing oxygen is fed through a pipe, etc. into the reservoir 420 again. The process described above is repeated continuously by the circulation pump 440. That is, the water circulates within the water treating means 400.

At the same time, the external power source 108 rotates the support rollers 106 under power and then the support rollers 106 rotate the drum 100. At that time, a proper speed is about 1 to 20 revolutions per hour. The grain will be effectively washed, germinated, and dried because of distribution by rotation of the drum 100. The user puts the ultraviolet lamp 130 light over the inside of the drum 100. Therefore, the inside of the drum 100 is sterilized.

The step (b) 20 is the step of loading the grain into the drum.

The grain is supplied into the drum 100 through the grain supply pipe 800. Preferably an amount of the grain to be supplied is about a fourth of a capacity of the drum 100 to avoid the grain from falling out of the drum 100 while the drum 100 is rotating. The grain to be germinated may be stored in a separate grain storehouse 810, and supplied into the drum 100 by opening of the grain supply pipe 800 having a controlling valve, etc. The grain supply pipe 800 having a controlling valve, etc. may be installed through one portion of the connector 600 or may be directly connected to the inlet port of the drum 100.

The step (c) 30 is the step of washing the grain in the drum 100 by spraying the purified water having an increased amount of dissolved oxygen for a predetermined number of hours. The step (c) progresses simultaneously with the step (a).

When the grain is supplied into the drum 100 rotating about its axis, the water supplied from the reservoir 420 by the washing pump 432 is strongly sprayed on the grain via each of the nozzles 312 fitted to the surface of the washing pipe 310. The washing of the grain is accomplished for a predetermined number of hours. Preferably the water is sprayed on the grain continuously for 50 to 70 minutes at first to remove dirt on the grain and then sprayed on the grain intermittently for 25 to 37 hours at 4 to 6 minutes per hour to wash by self-purification. The grain become clean by the washing process.

The step (d) 40 is the step of spraying with the circulating water, which contains ozone, on the grain in order to disinfect the grain in the drum and maintain a predetermined germination humidity, and at the same time, blowing air adjusted at a predetermined germination temperature into the drum 100 for a predetermined time. The step (d) progresses simultaneously with the step (a).

When the washing of the grain is completed, the spraying will stop. The circulating water containing ozone from the ozone generator 470 is supplied to the germinating pipe 320 by the germinating pump 434. The water is sprayed on the grain as a mist via each of the nozzles 322 fitted to the surface of the germinating pipe 320 by an operation of the germinating pump 434. The water, which is purified and contains ozone, keeps the inside of the drum 100 at a suitable humidity for germination and serves to destroy bacteria. Also, the first ventilator 510 supplies air, which is purified by the first air filter 518 and heated by the first heater 516, to the drum 100 for a predetermined number of hours. That is, the first heater 516, controlled by the first controller 519 that receives signals from the first thermal sensor 514 installed in the drum 100, heats the air at a suitable temperature for germination. Preferably the first heater 516 is controlled by the first controller 519 for the inside of the drum 100 to be kept at a temperature of about 25 to 35° C. for 25 to 37 hours. This temperature is a suitable temperature for germination and can change according to the amount and kind of grain. The grain will be germinated by the above process.

The step (e) 50 is the step of a final washing of the germinated grain by spraying on the grain with the circulating water for a predetermined time. The step (e) progresses simultaneously with the step (a).

If the grain germinates completely as described above, the operations of the germinating pump 434, the ozone generator 460, and the first fan 512 stop. At that time, the germinated grain receive a final wash to remove impurities formed during germination by spraying water on the grain via each of the nozzles 312 fitted to the surface of the washing pipe 310 for 15 to 25 minutes.

The step (f) 60 is the step of drying the grain which is germinated and washed to a predetermined water content by blowing the heated air into the drum 100. The step (f) progresses simultaneously with the step (a).

When the grain is washed completely, the washing pump 432 stops. At that time, the second ventilator 520 allows the grain to dry until the water content becomes about 11 to 15 weight percent by supplying hot air into the drum 100. Preferably the second ventilator 520 operates for about 5 to 10 hours so that the temperature of the air is about 40 to 70° C.

The step (g) 70 is the step of unloading the dried grains by lifting one end of the drum at a predetermined angle to the horizontal axis of the drum 100.

When the grain is dried as desired, the second ventilator 520 stops and the grain is discharged into the germinated grain storehouse 910. This process can be accomplished by putting the grain suction pipe 900 into the outlet portion of the drum 100 and then operating the grain suction pump 920. At that time, the lifter 210 allows the drum 100 to incline at a predetermined angle to the horizontal axis of the drum 100. If the outlet portion of the drum 100 is lowered, the grain gathers at a lower area of the outlet portion of the drum 100. Accordingly, the grain is discharged easily.

At that time, the slope of the drum 100 is variable because the connectors 600 connected to the inlet portion and outlet portion of the drum respectively may be made of flexible materials. Also, each of connectors which connects to the grain supply pipe 800, the washing pipe 310, the germinating pipe 320, etc. may be made of flexible materials to avoid interrupting the movement of the drum 100. A separate packing machine can pack the germinated grain in the germinated grain storehouse 910.

Duration of the process described above is about 50 to 80 hours. The duration can change in accordance with any given conditions, such as the amount of grain to be germinated, the kind of grain, etc.

Hereinafter, effects of the apparatus and method for germinating grain as constructed above will be described below.

The apparatus and method for germinating grain according to the present invention make it possible to produce germinated grain automatically by using electronic control devices.

Second, the apparatus and method for germinating grain according to the present invention make it possible to produce germinated grain in a large quantity in a short period of time due to accomplishing the task in one apparatus without moving grain from one place to another.

Third, the apparatus and method for germinating grain according to the present invention make it possible to produce germinated grain at a low cost and with less manpower because of the electronic control devices.

Fourth, the germinated grain can be preserved in an aseptic condition because of spraying disinfected water and shining UV lamp onto the grain.

Fifth, the apparatus and method for germinating grain according to the present invention make it possible to increase the rate of germination and obtain germinated grains of good quality because of spraying the water having an increased amount of dissolved oxygen and being under an optimum condition.

While this invention has been particularly shown and described with reference to particular embodiments thereof, it will be understood by those skilled in the art that various changes in form and details may be effected therein without parting from the spirit and scope of the invention as defined by the appended claims.

What is claimed is:

1. An apparatus for germinating grain comprising:
   a drum for containing the grain to be germinated having
      a plurality of drain holes pierced through a surface thereof and an insulating cover covering the drum for preventing heat within the drum from radiating, the drum being capable of rotating about an axis thereof;

spraying means extending through the drum along a longitudinal direction thereof for spraying water on the grain;

treating means connected to an end of the spraying means for heating, purifying, and increasing the amount of dissolved oxygen in the water, while circulating the water to be supplied to the spraying means; and blowing means connected to a portion of the drum for heating, purifying, and blowing air into the drum.

2. The apparatus as claimed in claim 1, wherein the drum further comprises a pair of end portions have a hollow truncated cone shape.

3. The apparatus as claimed in claim 1, wherein the drum further comprises a plurality of distributing plates protruded from an inner surface of the drum along the longitudinal direction for distributing and remixing the grain according to the rotation of the drum.

4. The apparatus as claimed in claim 1, wherein the drum further comprises at least one ultraviolet lamp attached to the spraying means for sterilizing the inside of the drum.

5. The apparatus as claimed in claim 1, further comprising at least one lifter located at one end portion of the insulating cover, for elevating a portion of the insulating cover to facilitate the discharging of the germinated grain when the germination is completed, and at least one hinge located at the other end portion of the insulating cover for rotatably securing the drum while the lifter the drum.

6. The apparatus as claimed in claim 1, wherein the spraying means comprises a washing pipe with a plurality of nozzles each having a diameter sufficient to wash the grain by spraying the water supplied from the treating means on the grain, and a germinating pipe with a plurality of nozzles each having a diameter smaller than the washing pipe nozzles to maintain the humidity inside the drum at a predetermined level for germination by spraying the water supplied from the treating means on the grain, wherein the washing pipe and the germinating pipe are mounted on the drum at a predetermined interval to avoid interruption of the rotation of the drum.

7. The apparatus as claimed in claim 6, wherein the treating means comprises a reservoir for containing the circulating water, a circulating pump connected to one portion of the reservoir for circulating the water to be supplied to the spraying means, a washing pump located between one end of the washing pipe and another portion of the reservoir for supplying the circulating water to the washing pipe, and a germinating pump located between one end of the germinating pipe and the reservoir for supplying the circulating water to the germinating pipe.

8. The apparatus as claimed in claim 7, wherein the treating means comprises a thermal sensor attached at an inner portion of the reservoir to sense the temperature of the circulating water, a controller electrically connected to the thermal sensor to generate a control signal in response to the thermal sensor, and a heater located in a selected portion of the treating means to heat the circulating water to a predetermined temperature according to the control signal.

9. The apparatus as claimed in claim 7, wherein the treating means comprises a water purifier located in a selected portion of the treating means and including pieces of bio-stone capable of purifying water to purify the circulating water.

10. The apparatus as claimed in claim 7, wherein the treating means comprises an oxygen supplier located at a selected portion of the treating means to increase the amount of dissolved oxygen in the circulating water.

11. The apparatus as claimed in claim 7, wherein the treating means comprises an ozone generator located between one end of a germinating pipe and one portion of the reservoir for providing the circulating water with an amount of ozone to disinfect the grain and the drum.

12. The apparatus as claimed in claim 1, wherein the blowing means comprises a first ventilator connected to an end of the drum for heating the air to a predetermined temperature and for supplying the air to the drum while the washed grain is germinating, and a second ventilator connected to the end of the first ventilator connected to the end of the drum for heating the air to a predetermined temperature and for supplying the air to the drum while the germinated grain is being dried, the second ventilator having a capacity larger than the first ventilator.

13. The apparatus as claimed in claim 12, wherein the first ventilator comprises a first fan for generating air to be supplied into the drum, a first thermal sensor attached to the drum for sensing the temperature inside of the drum, a first controller electrically connected to the first thermal sensor for generating a control signal in response to the first thermal sensor, a first heater located between the first fan and the drum for heating the air to the temperature of twenty five to thirty five degrees centigrade according to the control signal, and a first air filter located between the first fan and the drum for removing impurities in the air.

14. The apparatus as claimed in claim 12, wherein the second ventilator comprises a second fan for generating air to be supplied into the drum, a second thermal sensor attached inside the drum for sensing the temperature inside the drum, a second controller electrically connected to the second thermal sensor for generating a control signal in response to the second thermal sensor, a second heater located between the second fan and the drum for heating the air to the temperature of forty to seventy degrees centigrade according to the control signal, and a second air filter located between the second fan and the drum for removing impurities in the air.

15. The apparatus as claimed in claim 1, further comprising a connector made of flexible material for connecting the drum to the blowing means.

16. A method for germinating grain, comprising the steps of:

(a) while circulating water supplied from an external source, heating the water to a selected temperature, purifying the heated water, increasing the amount of dissolved oxygen in the purified water, switching on a ultraviolet lamp, and rotating a drum about its axis at one to twenty revolutions per hour;

(b) loading grain to be germinated into the drum;

(c) washing the grain in the drum by spraying the water treated in step (a) on the grain continuously for fifty to seventy minutes to remove dirt on the grain and then spraying the water on the grain intermittently for twenty five to thirty seven hours by four to six minutes per hour to wash the grain by self-purification;

(d) adding an amount of ozone to the water and spraying on the grain for disinfecting the grain and the drum and maintaining the inside of the drum at a predetermined humidity, and at the same time, blowing air having a temperature of twenty five to thirty five degrees centigrade into the drum for twenty five to thirty seven hours, thereby the grain germinates;

(e) washing the germinated grain by spraying the circulating water for fifteen to twenty minutes;

(f) drying the grain by blowing the air having a temperature of forty to seventy degrees centigrade for five to ten hours, making the water content of the grain eleven to fifteen weight percent; and (g) unloading the grain by lifting one portion of the drum at a predetermined angle to the horizontal axis of the drum to facilitate grain discharge when the germination is completed.

* * * * *